No. 610,762. Patented Sept. 13, 1898.
T. E. KEAVY.
BUFFING PAD.
(Application filed Oct. 22, 1896. Renewed June 30, 1898.)
(No Model.)
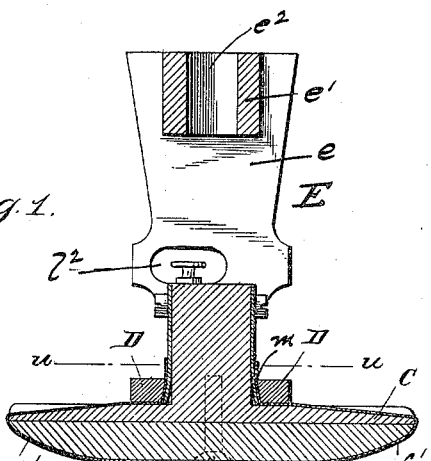
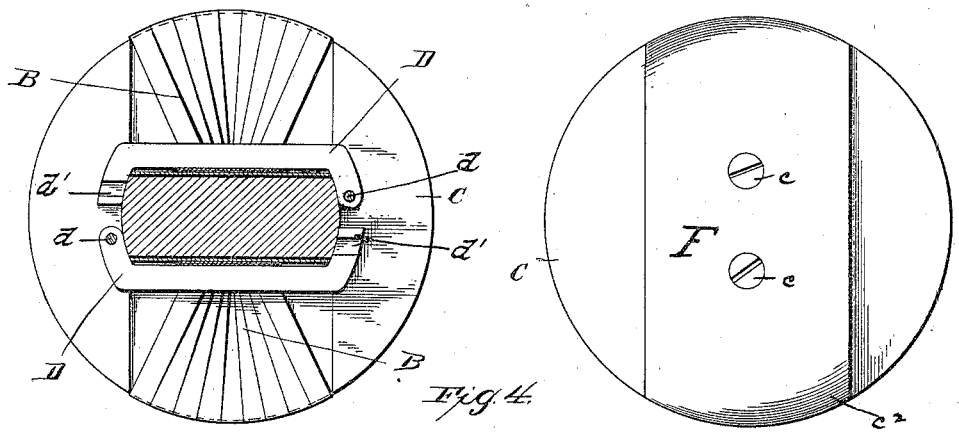
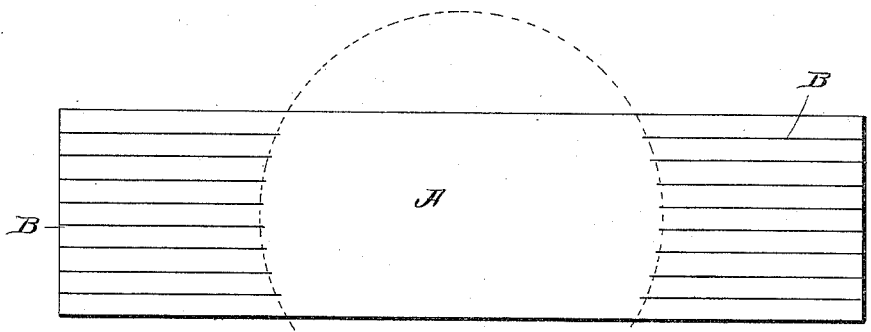
Witnesses
E. C. Wurdeman
S. J. Williamson
Inventor
Thomas E. Keavy
by Geo. H. Holgate
Attorney

UNITED STATES PATENT OFFICE.

THOMAS E. KEAVY, OF PHILADELPHIA, PENNSYLVANIA.

BUFFING-PAD.

SPECIFICATION forming part of Letters Patent No. 610,762, dated September 13, 1898.

Original application filed May 7, 1896, Serial No. 590,602. Divided and this application filed October 22, 1896. Renewed June 30, 1898. Serial No. 684,800. (No model.)

*To all whom it may concern:*

Be it known that I, THOMAS E. KEAVY, a citizen of the United States, residing at Philadelphia, in the county of Philadelphia and State of Pennsylvania, have invented a certain new and useful Improvement in Buffing-Pads and Methods of Producing the Same, of which the following is a specification.

The present invention relates to sandpapering and buffing machines, and more particularly to the type of such machines illustrated and described in my pending application, Serial No. 590,602, filed May 7, 1896, and of which the present application is a division.

In the application referred to I have shown, described, and claimed a chuck for a sandpapering and buffing machine having a disk-like face with an aperture or slot extending from the back of the chuck through the disk and two strips of abrading material extending through the aperture or slot and drawn in opposite directions across the face of the disk, the ends of the strips of abrading material being stripped and drawn over the periphery of the disk and conformed to the periphery and clamped in position for use.

The present invention has for its object to greatly simplify the device, whereby a single strip of abrading material may be employed, and it includes certain details of construction not specifically claimed in the application referred to.

To the above end the present invention consists of the devices and combination of devices which will be hereinafter described and claimed.

The present invention is illustrated in the accompanying drawings, in which—

Figure 1 shows a central vertical section of a chuck embodying the invention. Fig. 2 shows a transverse section upon line $u$ $u$, Fig. 1, looking at the back of the disk. Fig. 3 shows the face of the chuck with a pad secured thereto, and Fig. 4 one form of the abrading-strip.

Similar letters of reference represent corresponding parts throughout the several views.

In the drawings, E represents a chuck which comprises a suitable shank or standard consisting of side bars or uprights $e$, held together at their upper ends by a bridge $e'$, in which is formed a spindle-hole $e^2$ for securing the chuck or frame to a suitable spindle to rotate the same, and at its lower end the chuck is provided with a disk C, across the face of which the abrading material is drawn for use, as will be described. Upon the face of the disk C is fixedly secured in any suitable manner, as by the screws $c$, a pad or cushion F, of felt or any other suitable yielding material, the said pad being preferably of less width than the diameter of the disk and extending diametrically across the disk and preferably rounded off at each end to merge into and conform to the periphery of the disk, as shown at $c'$, and said pad is also beveled or rounded off, as shown in the shaded portions $c^2$ of Fig. 3 of the drawings, so as to have its diagonally opposite edges inclined to the plane of rotation, as in the application above referred to, and when the strip of abrading material is secured thereon and conformed to the surface of the pad it will form an abrading-surface the diagonal opposite edges of which will be inclined to the plane of rotation.

In the present invention instead of having two strips of abrading material passing from the face of the chuck and drawn in opposite directions across the face of the disk I employ a single strip of abrading material—such as sandpaper, emery-cloth, or other suitable material—secured in any suitable manner in operative position upon the face of the disk C. The strip of abrading material A is preferably of a width less than the diameter of the disk C and approximating the width of the pad or cushion F and may be and preferably is of such length that when placed upon the pad or cushion F the free ends of the strip of abrading material A may be turned over the periphery of the disk C and clamped in position thereon for use. The ends of the strip A when doubled over the edge of the disk C are crimped or otherwise comformed thereto, so that it will not present projecting edges or puckers which would be likely to catch upon the work operated upon as the chuck is rapidly rotated, and thus tear the abrading material off the chuck. The strip A where it passes over the periphery of the disk C may be conformed thereto by folding or crimping to take up the fullness, or, as shown in Fig.

4, the free ends may be cut or stripped, as shown at B, whereby said stripped ends may be brought into the overlapping position shown in Fig. 2, and thus cause the portion at the periphery to conform thereto.

Any suitable retaining device may be provided to hold the strip A in position upon the chuck F, that shown in the drawings comprising the horizontally-swinging clamping-levers D, which are fulcrumed at one end at $d$ to the back of the disk C and which at their opposite ends are provided with a notch $d'$, which is engaged by a spring-pressed bolt or pin $d^2$, the levers D clamping the free ends of the strip A against spring-plates $m$, all as in the application referred to.

In the operation of my invention the chuck E is mounted upon a spindle to which a rapid rotary motion is imparted, and the abrading-strip A having been drawn across the face of the disk C and secured in position thereon, as described, the shoe or other article being treated is pressed against the face of the abrading material, which quickly smoothes and scours the same. When the strip of abrading material becomes worn, a new strip is substituted and the operation repeated.

It will be noted that by the employment of a strip of abrading material of less width than the diameter of the disk it can be quickly adjusted in position and its ends conformed to the periphery of the disk without objectionable folds or puckers.

Having described the construction and mode of operation of my invention, I claim as new and desire to secure by Letters Patent of the United States—

1. In a sandpapering or buffing machine, the combination with a rotating disk, of a strip of abrading material of less width than the diameter of the disk, extending across the face of the disk, and conforming at each end to the periphery of the disk, and means to retain said abrading material in position upon the disk, substantially as described.

2. In a sandpapering or buffing machine, the combination with a rotating disk, of a strip of abrading material of less width than the diameter of the disk, extending across and raised above the face of the disk and conforming at each end to the periphery of the disk, and means to retain said abrasive material in position upon the disk, substantially as described.

3. In a sandpapering and buffing machine, the combination with a suitable rotating pad or support, of a strip of abrading material having substantially parallel edges extending across the face of the pad or support, and having diagonally opposite portions of its abrading surface along said edges laterally inclined to its plane of rotation, substantially as described.

In testimony whereof I have hereunto affixed my signature in the presence of two subscribing witnesses.

THOMAS E. KEAVY.

Witnesses:
S. S. WILLIAMSON,
MARK BUFORD.